Feb. 4, 1958     T. F. TOUHILL, JR     2,821,786
GEAR TOOTH MEASURING DEVICE
Filed Jan. 7, 1957     2 Sheets-Sheet 1
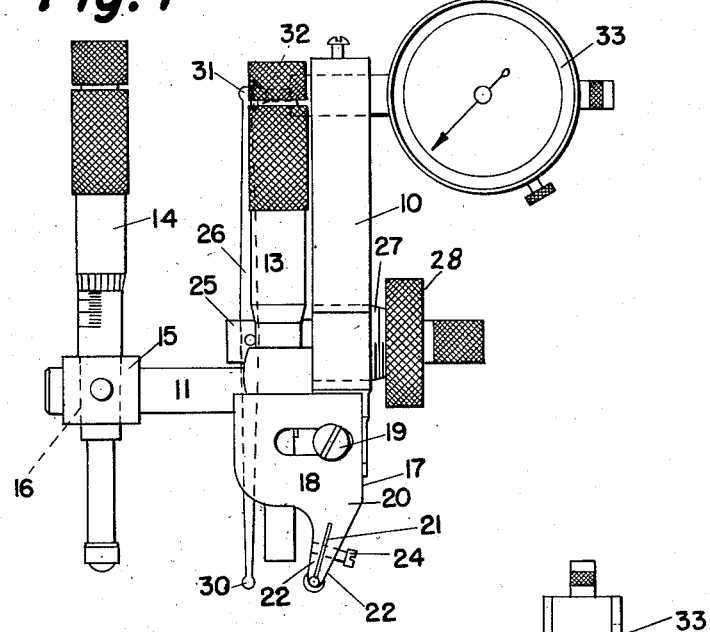
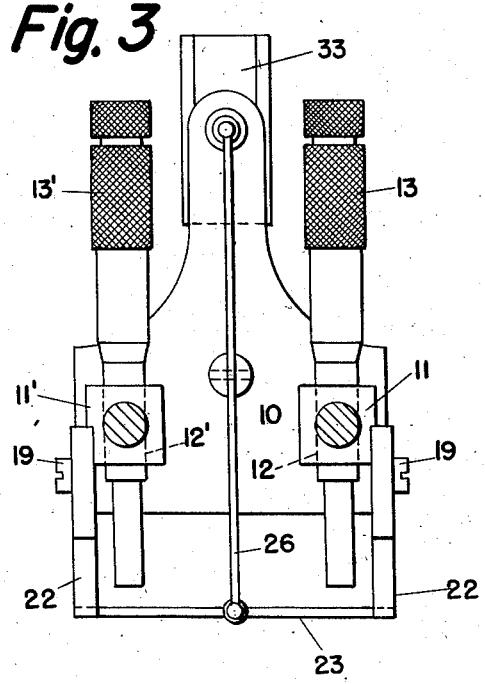
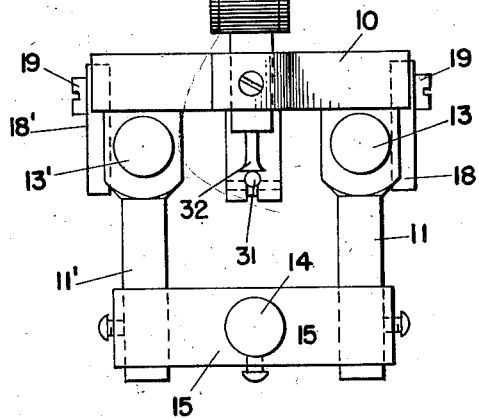
INVENTOR.
THOMAS F. TOUGHILL JR.
BY George Sipkin
J. F. Sheehan
ATTORNEYS Feb. 4, 1958     T. F. TOUHILL, JR     2,821,786
GEAR TOOTH MEASURING DEVICE
Filed Jan. 7, 1957     2 Sheets-Sheet 2
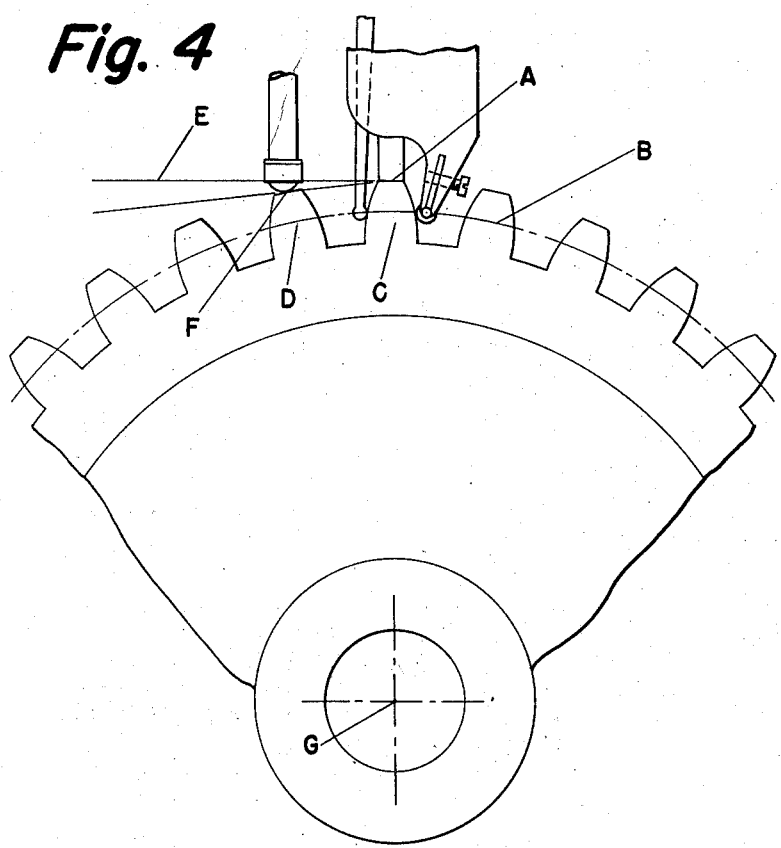
INVENTOR.
THOMAS F. TOUGHILL JR.
BY
ATTORNEYS United States Patent Office 2,821,786
Patented Feb. 4, 1958

2,821,786
GEAR TOOTH MEASURING DEVICE

Thomas F. Touhill, Jr., Williamstown, N. J., assignor to the United States of America as represented by the Secretary of the Navy Application January 7, 1957, Serial No. 632,949

1 Claim. (Cl. 33—179.5)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in gear tooth measuring instruments and particularly is concerned with an instrument for accurately measuring the thickness of gear teeth at selected distances from the top of the tooth being measured.

The principal object of the invention is to provide an instrument which will effect the measuring by indicating any variation in tooth thickness over an established standard.

Another object is to provide a device which can be accurately adjusted by an operator to a standard tooth thickness and then positioned on a selected tooth of a gear wheel to indicate variations in tooth thickness.

Still another object is to provide such a device which will indicate variations in the thickness of a gear tooth without being subject to operator errors.

Other objects and advantages of the invention will hereinafter become more fully apparent from the following description of the annexed drawings, which illustrate a preferred embodiment, and wherein:

Fig. 1 is a side elevational view of the gear tooth measuring and indicating device;

Fig. 2 is a top plan view of the device;

Fig. 3 is a front elevational view of the device with portions removed; and

Fig. 4 is a view of a portion of the device positioned on adjacent teeth of a gear wheel segment to demonstrate its mode of use.

Specifically, the present invention comprises three micrometers which are mounted on a common support and are so relatively arranged that their lower ends form the points of a triangle. The lower ends are positioned on the upper edges of two selected teeth of a gear wheel during a measuring operation. The lower ends of a pair of the micrometers are disposed on the tooth to be measured while the lower end of the third micrometer is disposed on an adjacent or another tooth of a gear wheel. All of the micrometers are adjustable in order to permit the pair of micrometers to be positioned or set on the tooth to be measured and to permit the third micrometer to be positioned or set on another tooth, and the tooth thickness determined without being subject to error by the operator or user handling the device.

An adjustable bracket is carried by the micrometer support and mounts a feeler which provides line contact with one face of the tooth being measured and a second feeler arm is carried by the support in spaced relation with the first feeler arm and provides point contact with the other face of the tooth. The second feeler arm is pivotally mounted to actuate a dial indicator and this feeler is horizontally adjustable relative to the support in order to adjust the feeler arms to a standard tooth thickness and then the dial may be set at zero before using the instrument.

In using the instrument, the feeler arms are set in accordance with a standard tooth width and the dial set to zero. The micrometers are then adjusted to position the lower ends of the pair on the upper edge of the tooth which is to be measured and the upper edge of the third is positioned on an adjacent or selected tooth. When the instrument is seated on these teeth, the feelers will contact the tooth which is being measured and any variation from the standard will be indicated on the dial.

In Figs. 1, 2 and 3 the support is indicated at 10, and since the device will be described as it is positioned in use, as shown in Fig. 4, the support 10 is generally vertical and the supported elements are relatively positioned. Adjacent its lower end, the support is provided with longitudinal extensions 11 and 11', each of which has one end fixed to the support and extends longitudinally from the front face of the support, and a free end. The extensions are horizontally aligned and openings 12, 12' are provided for receiving one of the micrometers 13, 13' in each extension. A transverse plate 15 is adjustably fixed adjacent the free end of the extensions 11 and 11' and is provided with a drilled opening 16 for receiving the third micrometer. The above described micrometers are thus arranged in the form of an isoceles triangle.

A bracket 17 extends across the lower rear face of the support 10 and is provided with bracket arms 18, 18' each of which, as shown at 18 in Fig. 1, is formed with a longitudinal slot and adjusting screws 19, 19' are provided for positioning the bracket arms as desired relative to the support. Each bracket arm has a depending portion 20 which is bifurcated at 21 to provide spring clamping fingers 22, 22' for receiving the end portions of a transverse feeler 23 which is removably clamped between the fingers by a locking screw 24 and positioned to provide line contact with one face of the tooth being measured.

A rod 25 extends longitudinally of the device through an aperture in the support 10, preferably in a plane above the extensions 11 and 11' and pivotally mounts a vertical feeler arm 26 at its front end. At its rear end, the rod 25 is received by a threaded sleeve 27 and a cooperating tightening nut 28 is provided to permit longitudinal adjustment of the vertical feeler 26 relative to the transverse feeler 23. The lower end 30 of the feeler 26 is positioned to contact the opposite face of the tooth which is being measured and the upper end 31 of this feeler abuts an actuating arm 32 which operates the dial 33.

Referring to Fig. 4 for an explanation of the use of the device, the distance from A, which is the top of tooth C, to B, which may be the pitch line of tooth C, is measured. The pair of micrometers are adjusted vertically so that the transverse feeler 23 contacts one face of the tooth C at this line. A horizontal line E is projected from the top of tooth C and a measurement to the top F of another tooth D from this projected line is made or this distance may be calculated by triangulation, and the third micrometer is adjusted vertically and longitudinally to be positioned on tooth D. The vertical feeler 26 having been set or adjusted relative to feeler 23 to a known or standard tooth thickness and the dial 33 set at zero, the lower end 30 of the feeler 26 will then contact the other face of tooth C by adjusting itself to the thickness of tooth C and any variation from the standard will be indicated on the dial as a measure or indication of the difference in thickness of tooth C over the standard.

Obviously many modifications and variations of the present invention are possible in the light of the above teachings. It is therefore to be understood that within the scope of the appended claim the invention may be practiced otherwise than as specifically described.

What is claimed is:

A gear tooth measuring instrument comprising a vertically disposed supporting plate, a pair of spaced horizontal arms each having one end fixed to the supporting plate and a free end spaced therefrom, a transverse brace interconnecting the horizontal arms, a vertically adjustable front leg mounted in an opening in the transverse brace equidistant from the horizontal arms, a vertically adjustable rear leg mounted in an opening in each horizontal arm equidistant from the support providing aligned rear legs, each of said legs having a foot portion below the parallel arms, said transverse brace being adjustably mounted to permit the rear legs to be disposed on one gear tooth and the front leg to be disposed on another tooth of a gear wheel, a pair of side plates, one plate being adjustably mounted at one side of the supporting plate and the other being adjustably mounted at the other side of the supporting plate, a transverse feeler arm mounted between the side plates and positioned rearwardly of and below the foot portions of the aligned rear legs, an adjustable rod extending horizontally through the support having a front end portion and rear end portion, a vertical arm pivotally mounted on said front end portion of the adjustable rod and having a lower feeler end disposed below and in front of the foot portions of the aligned rear legs and an upper end disposed above the horizontal arms, said side plates and said adjustable rod permitting relative movement between the transverse feeler arm and the feeler end of the vertical arm to select a spacing therebetween equal to a gear tooth of standard width, a dial indicator mounted by the vertical support above the horizontal arms and operable by the upper end of the vertical arm upon movement of its feeler end to indicate variations from the standard tooth width.

References Cited in the file of this patent

UNITED STATES PATENTS

| | | |
|---|---|---|
| 1,567,134 | Goswell | Dec. 29, 1925 |

FOREIGN PATENTS

| | | |
|---|---|---|
| 480,868 | Great Britain | Mar. 2, 1938 |
| 597,296 | Great Britain | Jan. 22, 1948 |